(12) United States Patent
Tatamiya

(10) Patent No.: US 6,456,800 B1
(45) Date of Patent: Sep. 24, 2002

(54) CAMERA HAVING MECHANISM FOR CHANGING FRAME SIZE

(75) Inventor: Hisashi Tatamiya, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 49 days.

(21) Appl. No.: 09/689,687

(22) Filed: Oct. 13, 2000

(30) Foreign Application Priority Data

Oct. 14, 1999 (JP) .......................................... 11-292222

(51) Int. Cl.$^7$ ................................................. G03B 17/00
(52) U.S. Cl. ...................................................... 396/435
(58) Field of Search ................................ 396/340, 435, 396/436

(56) References Cited

U.S. PATENT DOCUMENTS

| | | | |
|---|---|---|---|
| 4,226,524 A | 10/1980 | Kawasaki et al. | .......... 396/242 |
| 4,597,654 A * | 7/1986 | Harvey et al. | .............. 396/207 |
| 5,066,971 A * | 11/1991 | Kodaira | ........................ 396/52 |
| 5,367,351 A | 11/1994 | Suzuka | ........................ 396/436 |
| 5,742,854 A * | 4/1998 | Saito et al. | .................. 396/311 |

* cited by examiner

Primary Examiner—David M. Gray
Assistant Examiner—Rochelle Blackman
(74) Attorney, Agent, or Firm—Greenblum & Bernstein, P.L.C.

(57) ABSTRACT

A frame size changing device for a camera to change a frame size by masking part of an aperture defining the maximum size of the frame is provided with a pair of flexible light-shielding curtain members, a pair of drawing mechanisms located outside of the aperture, the pair of drawing mechanism being biased to draw the pair of curtain members to move away from the aperture, respectively, a manually operable member that is manually operated to move within a predetermined movable range, the pair of curtain members to be inserted in and retracted from the aperture in accordance with the movement of the operable member, and a holding mechanism that holds the manually operable member at a desired position within the movable range.

9 Claims, 4 Drawing Sheets

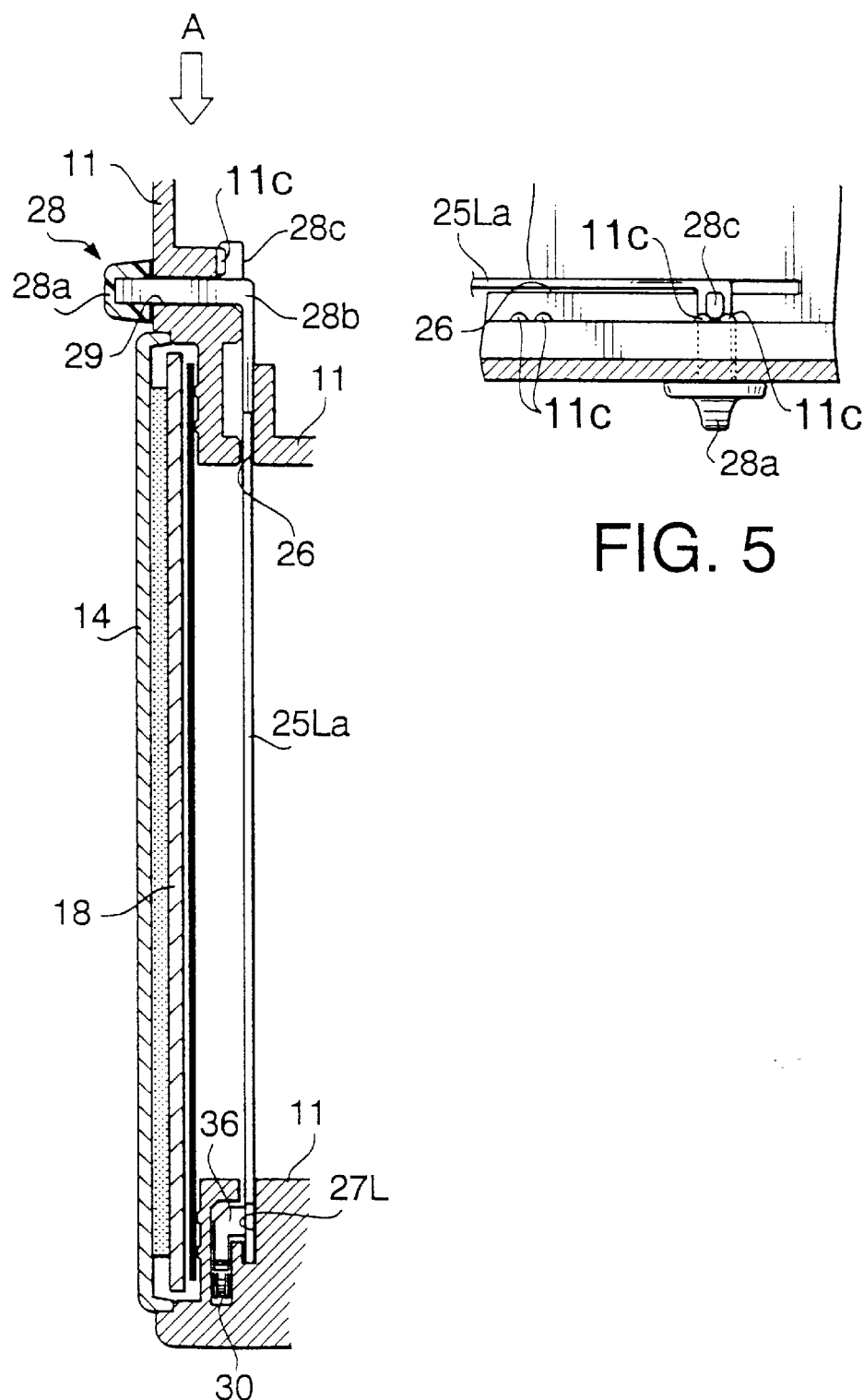

CAMERA HAVING MECHANISM FOR CHANGING FRAME SIZE

BACKGROUND OF THE INVENTION

The present invention relates to a camera having a mechanism for changing a size of a photographing frame.

Conventionally, there has been known a mechanism for switching a size of a photographing frame. Examples of such a mechanism for changing the photographing frame size of a 35 mm format film are: one for switching between a standard size and a half size; one for switching the standard size and a panorama size; and a classic size and a hi-vision size.

Recently, needs of users to shoot photographs at various sizes have arisen. However, if the conventional frame size changing mechanism is modified to achieve a mechanism for switching the frame size among three or more sizes, the mechanism may be complicated, and the size of such a mechanism may be relatively large.

SUMMARY OF THE INVENTION

It is therefore an object of the present invention to provide an improved camera having a mechanism for switching a size of a photographing frame from among various sizes with a relatively simple structure.

For the above object, according to the present invention, there is provided a frame size changing device for a camera to change a frame size by masking part of an aperture defining the maximum size of the frame. The frame size changing device is provided with a pair of light-shielding curtain members, the pair of light-shielding curtain members being flexible, a pair of drawing mechanisms located outside of the aperture, the pair of drawing mechanism being biased to draw the pair of curtain members to move away from the aperture, respectively, a manually operable member that is manually operated to move within a predetermined movable range, the pair of curtain members to be inserted in and retracted from the aperture in accordance with the movement of the operable member, and a holding mechanism that holds the manually operable member at a desired position within the movable range.

With this configuration, since the frame size is defined by the curtain members which can be located at a desired position, various sizes of frame can be formed with a simple structure.

Optionally, the pair of drawing mechanism may include chambers and a pair of rotatable shafts housed in the chambers, respectively, the pair of curtain members being wound on the rotatable shafts, respectively, the rotatable shaft being biased to rotate in a direction where the pair of curtains being drawn in the pair of chambers, respectively.

It is preferable that the pair of curtain members move symmetrically with respect to a center line of the aperture. With this movement, the center of the frame always coincides with the center of the aperture regardless of the frame size defined by the curtain members.

In a particular case, the manually operable member is connected to an end of one of the pair of curtain members, an end of the other one of the pair of curtain members is connected with the end of one of the pair of curtain members through an interlocking mechanism.

In the above case, the manually operable member may include an operation knob and a connection shaft that connects the operation knob and the end of the one of the pair of curtain members, the connection shaft is slidably fitted in and guided by a guide slit formed on a body of the camera.

Optionally, the interlocking mechanism may include a belt, one end of the belt being secured to the end of one of the pair of curtain members, the belt being turned round a shaft member that is fixed to the camera, the other end the belt being connected to the end of the other one of the pair of curtain members, the pair of curtain members moving in opposite directions with respect to the center line of the aperture.

Further optionally, the holding mechanism may include a click mechanism defining a plurality of click points, the click mechanism preventing the operation knob from moving due to the force to draw the pair of curtain members generated by the pair of drawing mechanisms when the operation knob is located at one of the plurality of click points.

Still optionally, the holding mechanism is capable of holding the manually operable member at more than two different positions.

Yet optionally, the aperture may define a photographing frame of the camera.

In a particular case, the camera uses a Brownie film, the maximum size of the aperture corresponds to a photographing frame size of 60×90 mm, and the holding mechanism is capable of holding the manually operable member at positions that correspond the photographing frame size of 60×90 mm, and at least one of 60×80 mm, 60×70 mm, 60×60 mm and 60×45 mm.

Also in a particular case, the camera uses a Brownie film, and the holding mechanism is capable of holding the manually operable member at positions that corresponds to the photographing frame size of 60×90 mm, 60×80 mm, 60×70 mm, 60×60 mm and 60×45 mm.

According to another aspect of the invention, there is provided a frame size changing device for a camera to change a frame size by masking part of an aperture defining the maximum size of the frame. The frame size changing device is provided with a pair of light-shielding curtain members, the pair of light-shielding curtain members being flexible, the pair of curtain members being movable, within a predetermined range, to be inserted in and retracted from the aperture, a pair of drawing mechanisms located outside of the aperture, the pair of drawing mechanisms being biased to draw the pair of curtain members to move away from the aperture, respectively, and a holding mechanism that holds the pair of curtain members at a desired position within the movable range.

DESCRIPTION OF THE ACCOMPANYING DRAWINGS

FIG. 4 is a side view of the frame size switching mechanism; and

FIG. 5 is an enlarged view showing a click mechanism viewed along arrow A in FIG. 4.

DESCRIPTION OF THE EMBODIMENT

A camera according to an embodiment of the present invention will be described with referring to the accompanying drawings.

Figure 1:
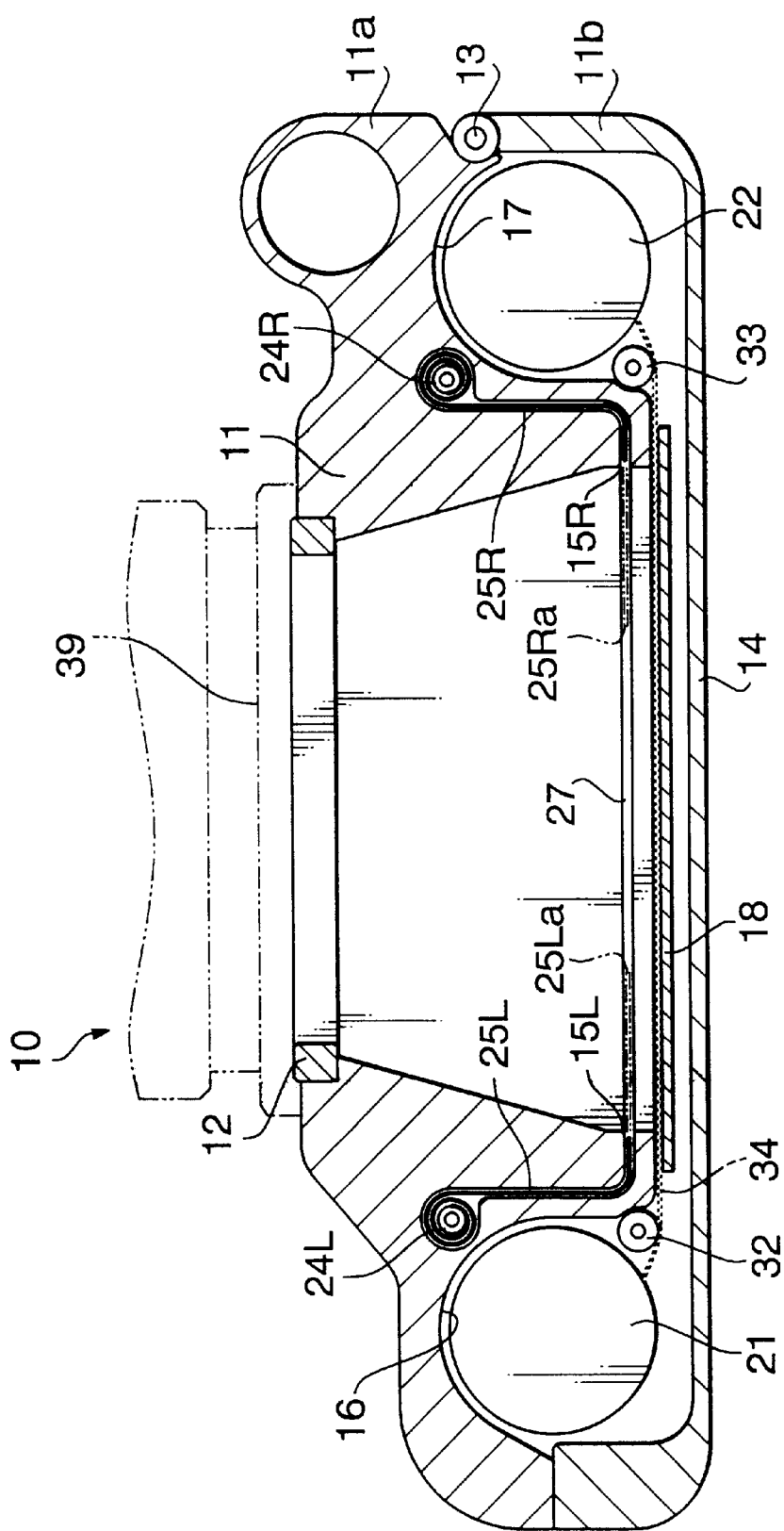
FIG. 1 is a cross sectional plan view of a camera, taken along line I—I in FIG. 2, according to an embodiment of the invention.
Figure 2:
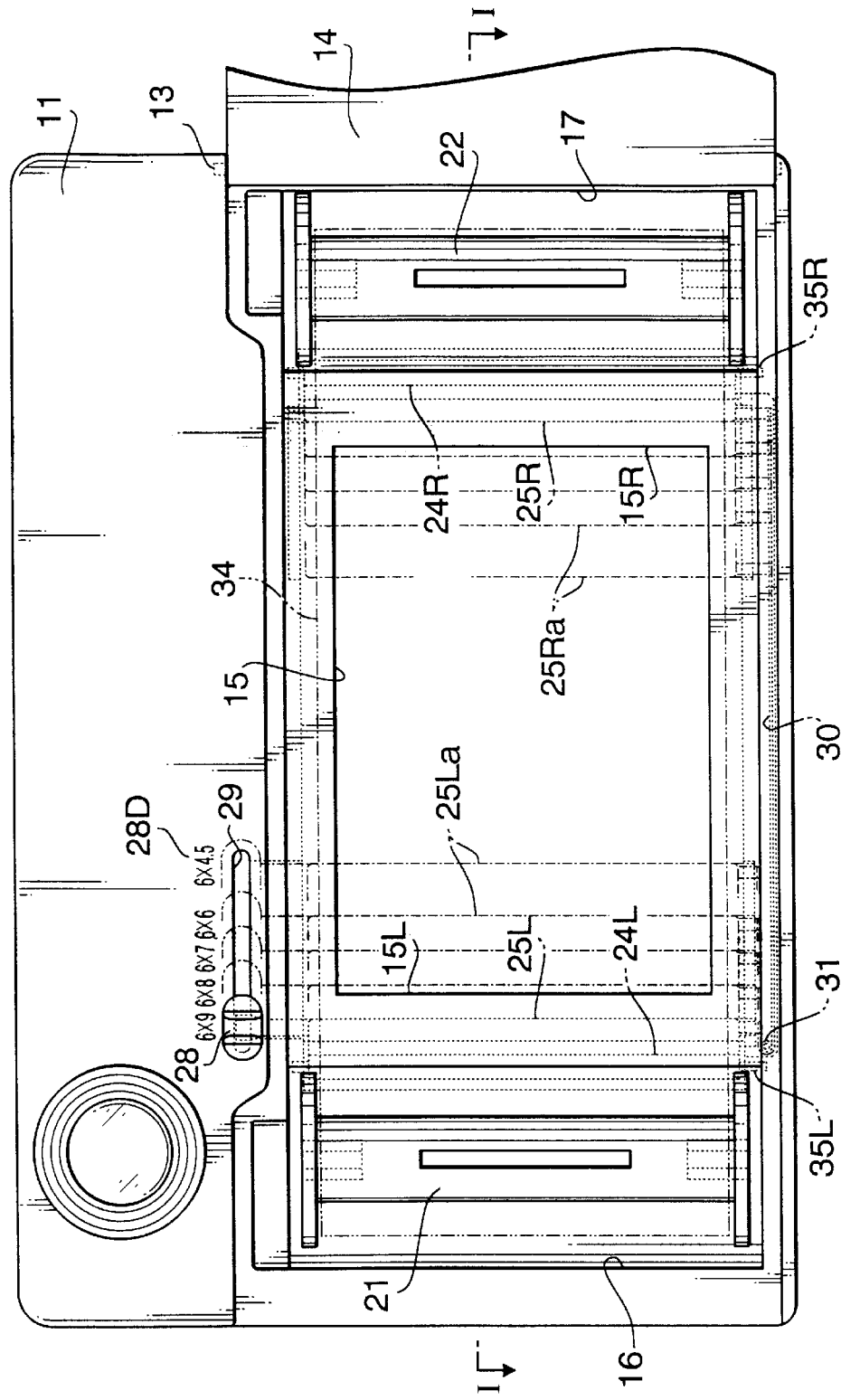
FIG. 2 is a rear view of the camera with the back cover opened.

FIG. 1 is a cross sectional plan view of a camera 10, taken along line I—I in FIG. 2, according to an embodiment of the invention, and FIG. 2 is a rear view of the camera 10 with the back cover opened. It should be noted that, in the accompanying drawings, some elements, which are indispensable for a camera to function, such as a shutter block, are omitted for simplifying the drawings.

The camera 10 uses Brownie film, and a size of a photographing frame can be switched from among five different sizes.

The camera 10 has a camera body 11, which is composed of a main body 11a and an openable back cover 11b. The main body 11a has a lens mount 12 onto which a photographing lens 39 is mounted. The back cover 11b is swingably pivoted to the main body 11a at the end thereof by a pivot shaft 13 so that a film 34 is loaded/removed. Inside the main body 11a, an aperture 15 (see FIG. 2) is formed, which defines the maximum photographing frame size. In this embodiment, the film 34 is a so-called Brownie film, and the maximum frame size is 60×90 mm.

As shown in FIGS. 1 and 2, a take-up spool chamber 17 and a film spool chamber 16 are formed on the right- and left-hand sides of the aperture 15, respectively. A film 34 is taken out of a film spool 21 placed in the film spool chamber 16, fed through a film feed path defined on a rear side of the aperture 15, and is taken up by a take-up spool 22 placed in the take-up spool chamber 17. A pressure plate 18, which is fixed on the back cover 14, is resiliently urged to contact a pair of rails (not shown) which are located upper and lower sides of the aperture 15 and extend in the right- and left-hand direction in FIG. 1 to define the film feed path. Reference numerals 32 and 33 represent guide rollers for guiding the film 34 fed from the film spool 21 to the take-up spool 22.

Right and left web shafts 24R and 24L are provided, which are housed in web chambers defined inside the main body 11a, on the inner sides with respect to the take-up spool chamber 17 and the film spool chamber 16, respectively.

Light-shielding curtain members 25R and 25L made of a flexible material are wound around the web shafts 24R and 24L, respectively. The web shafts 24R and 24L are parallel to the take-up spool 22 and the film spool 21, and are biased by torsion springs 35R and 35L to rotate in directions where the curtain members 25R and 25L are wound up thereby, respectively. In the camera 10 shown in FIG. 1, the web shaft 24R is biased to rotate clockwise, while the web shaft 24L is biased to rotate counterclockwise.

Figure 3:
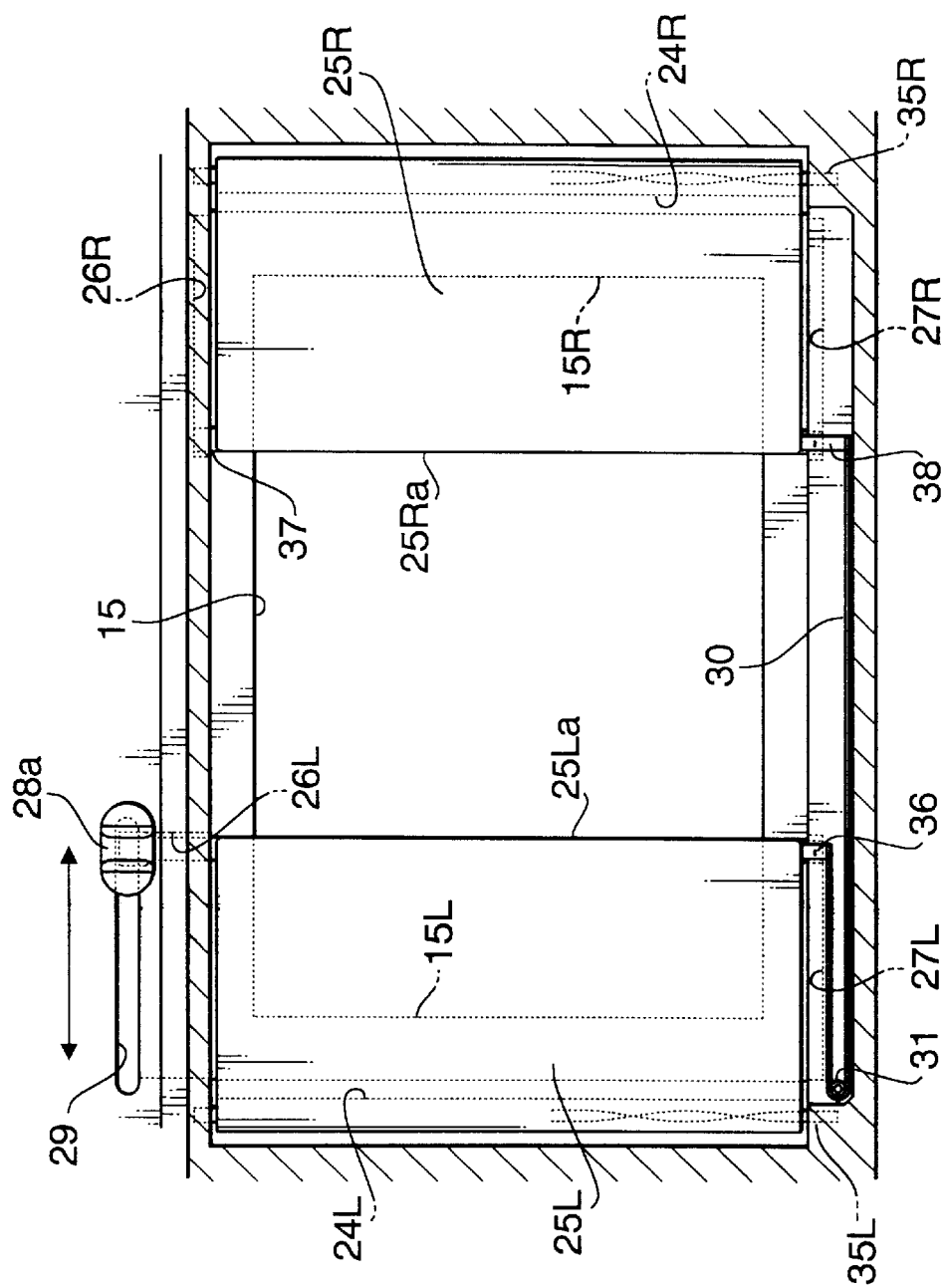
FIG. 3 is a partial rear view showing a frame size switching mechanism.

Guide grooves 26R and 26L are formed on an inner upper wall of the main body 11a (see FIG. 3). The guide grooves 26R and 26L extend from the web chambers 24R and 24L over the aperture 15 for allowing the curtain members 25R and 25L to slide therein, respectively. Aperture side ends 25Ra and 25La of the curtain member 25R and 25L are parallel with sides 15R and 15L of the aperture 15, respectively. It is preferable that each of the side ends 25Ra and 25La of the curtain member 25R and 25L is formed to be stiff or attached with reinforcing material.

Further, corresponding to the guide grooves 26R and 26L, guide grooves 27R and 27L are formed on an inner lower wall of the main body 11a (see FIG. 3). The guide grooves 27R and 27L also allow the curtain members 25R and 25L to slide therein, respectively.

As shown in FIG. 4, at the upper portion of the end 25La of the curtain member 25L, an operating member 28 is secured. Specifically, the operating member 28 consists of an operation knob 28a and an L-shaped shaft 28b. One end of the L-shaped shaft 28b is secured to the curtain member 25L, and the other end of the L-shaped shaft 28b is secured to the operation knob 28a. The L-shaped shaft 28b is slidably fitted in a laterally extending guide slit 29 formed on the rear upper wall of the main body 11a (see FIGS. 2 and 4).

A protrusion 38 is provided at the lower end of the side end 25Ra, and a protrusion 36 is provided at the lower end of the side end 25La of the curtain member 25L. An end portion of a belt 30 is secured to the protrusion 36. The belt 30 is turned round a guide roller 31, and the other end of the belt 30 is secured to the protrusion 38. In FIG. 4, the protrusion 36 is shown. Further, as shown in FIG. 4, on the bottom surface of the main body 11a, a guide groove 27 for guiding the curtain members 25R and 25L is formed at a position corresponding to the guide groove 26.

It should be noted that, in the embodiment, the curtain members 25R and 25L and the belt 30 are arranged to move in the direction parallel to the direction where the film is fed. Alternatively, the curtain members may be arranged to move in a direction perpendicular to the direction where the film is fed.

Since the web shafts 24R and 24L are biased, the curtain members 25R and 25L are neutrally wound by the web shafts 24R and 24L, respectively. Therefore, the operation knob 28a is neutrally located at the left-most position along the guide slit 29. At this stage, the aperture 15 is fully open to define the 60×90 mm photographing size. In FIG. 2, the neutral position of the operation knob 28a is indicated by a solid line.

As will be described in detail below, the side ends 25Ra and 25La of the curtain members 25R and 25L move in opposite directions, symmetrically with respect to the center line of the aperture 15.

When the operation knob 28a is operated to slide in the right-hand direction, the side end 25La of the curtain member 25L is inserted within the aperture 15 as indicated by the one-dotted lines. In association with the movement of the curtain member 25L, the side end 25Ra of the curtain member 25R is driven, via the belt 30, to move in the left-hand direction. Therefore, the curtain member 25R is also inserted within the aperture 15 as indicated by the one-dotted lines. If the operation knob 28a is operated in the left-hand direction, the side end 25Ra moves rightward, and the side end 25La moves leftward, the curtain members 25R and 25L are rewound by the web shaft 24R and 24L, respectively. Accordingly, by operating the operation knob 28a, the curtain members 25R and 25L move symmetrically with respect to the center line of the aperture 15 to mask side portions of the aperture and vary the size of the photographing frame.

In the embodiment, a well-known click mechanism is provided to indicate five predetermined positions corresponding to the photographing frame size of 60×90 mm, 60×80 mm, 60×70 mm, 60×60 mm, and 60×45 mm. Above the guide slit 29, each frame size is provided to indicate the positions of the operation knob 28. It should be noted that in FIG. 2, the sizes are indicated by centimeters.

FIG. 5 is an enlarged view of the operation knob 28a and the click mechanism, viewed along arrow A in FIG. 4. As shown in FIGS. 4 and 5, on the inner surface of the rear wall of the main body 11b, adjacent to the guide slit 29, a plurality of pairs of protrusions 11c and 11c are formed. On the other hand, on the shaft 28b, at a position corresponding to the protrusions 11c and 11c, an engaging protrusion 28c is formed. As the operation knob 28 is operated to slide along the guide slit 29, the engaging protrusion 28c is caught by one of the pair of protrusions 11c and 11c. The engagement prevents the operation knob 28 to move due to rewinding forth of the curtain members 25R and 25L.

When the operation knob 28a is located at the leftmost position, the photographing frame size is 60×90 mm. By sliding the operation knob 28 rightward by one step, the curtain members 25R and 25L covers both side end portion of the aperture to define 60×80 mm frame. In this manner, the size of the photographing frame can be switched among the 60×90 mm frame, 60×80 mm frame, 60×70 mm frame, 60×60 mm frame, and 60×45 mm frame. The pairs of the click protrusions 11c and 11c are provided at the positions corresponding to the photographing frame sized above.

In the above-described embodiment, the camera 10 is a camera using the Brownie film. However, the invention is not limited to such a camera, but can be applied to cameras using various sizes of films such as 35 mm film.

The frame size switching mechanism can be applied to switch the size of a finder frame field.

In the embodiment, the curtain members are moved along a longitudinal side of the aperture. However, the invention is not limited to this configuration, and a mechanism for moving the curtain members along the shorter side of the aperture may alternatively or optionally be employed.

In the embodiment, the mechanism is described such that the photographing frame size is switched among a plurality of predetermined sizes. This configuration is intended to provide a standardized frame size. However, the invention is not limited to such a configuration, and with employing an appropriate mechanism to hold the curtain members at a desired position, the size of the photographing frame can be changed arbitrary.

The present disclosure relates to the subject matter contained in Japanese Patent Application No. HEI 11-292222, filed on Oct. 14, 1999, which is expressly incorporated herein by reference in its entirety.

What is claimed is:

1. A frame size changing device for a camera to change a frame size by masking part of an aperture defining the maximum size of said frame, comprising:
   a pair of light-shielding curtain members, said pair of light-shielding curtain members being flexible;
   a pair of drawing mechanisms located outside of said aperture, said pair of drawing mechanisms being biased to draw said pair of curtain members to move away from said aperture, respectively;
   a manually operable member that is manually operated to move within a predetermined movable range, said pair of curtain members to be inserted in and retracted from said aperture in accordance with the movement of said operable member;
   a holding mechanism that holds said manually operable member at a desired position within said movable range;
   said manually operable member is connected to an end of one of said pair of curtain members, an end of the other one of said pair of curtain members is connected with said end of one of said pair of curtain members through an interlocking mechanism; and
   wherein said interlocking mechanism includes a belt, one end of said belt being secured to the end of one of said pair of curtain members, said belt being turned round a shaft member that is fixed to said camera, the other end of said belt being connected to the end of the other one of said pair of curtain members, said pair of curtain members moving in opposite directions with respect to the center line of said aperture.

2. The frame size changing device according to claim 1, wherein said pair of drawing mechanisms include chambers and a pair of rotatable shafts housed in said chambers, respectively, said pair of curtain members being wound on said rotatable shafts, respectively, said rotatable shafts being biased to rotate in a direction where said pair of curtains being drawn in said pair of chambers, respectively.

3. The frame size changing device according to claim 1, wherein said pair of curtain members move symmetrically with respect to a center line of said aperture.

4. The frame size changing device according to claim 1, wherein said manually operable member includes an operation knob and a connection shaft that connects said operation knob and the end of said one of said pair of curtain members, said connection shaft is slidably fitted in and guided by a guide slit formed on a body of the camera.

5. The frame size changing device according to claim 1, wherein said holding mechanism is capable of holding said manually operable member at more than two different positions.

6. The frame size changing device according to claim 1, wherein said aperture defines a photographing frame of said camera.

7. The frame size changing device according to claim 6, wherein said camera uses a Brownie film, wherein said maximum size of said aperture corresponds to a photographing frame size of 60×90 mm, and wherein said holding mechanism is capable of holding said manually operable member at positions that correspond the photographing frame size of 60×90 mm, and at least one of 60×80 mm, 60×70 mm, 60×60 mm and 60×45 mm.

8. The frame size changing device according to claim 6, wherein said camera uses a Brownie film, and wherein said holding mechanism is capable of holding said manually operable member at positions that corresponds to the photographing frame size of 60×90 mm, 60×80 mm, 60×70 mm, 60×60 mm and 60×45 mm.

9. A frame size changing device for a camera to change a frame size by masking part of an aperture defining the maximum size of said frame, comprising:
   a pair of light-shielding curtain members, said pair of light-shielding curtain members being flexible;
   a pair of drawing mechanisms located outside of said aperture, said pair of drawing mechanisms being biased to draw said pair of curtain members to move away from said aperture, respectively;
   a manually operable member that is manually operated to move within a predetermined movable range, said pair of curtain members to be inserted in and retracted from said aperture in accordance with the movement of said operable member;
   a holding mechanism that holds said manually operable member at a desired position within said movable range;
   said manually operable member is connected to an end of one of said pair of curtain members, an end of the other one of said pair of curtain members is connected with said end of one of said pair of curtain members through an interlocking mechanism; and
   wherein said holding mechanism includes a click mechanism defining a plurality of click points, said click mechanism preventing said operation knob from moving due to the force to draw said pair of curtain members generated by said pair of drawing mechanisms when said operation knob is located at one of said plurality of click points.

* * * * *